US008291334B1

(12) United States Patent
Castellanos et al.

(10) Patent No.: US 8,291,334 B1
(45) Date of Patent: Oct. 16, 2012

(54) METHOD AND APPARATUS FOR CREATING A DIGITAL DASHBOARD

(75) Inventors: Maria G. Castellanos, Palo Alto, CA (US); Fabio Casati, Trento (IT); Mehmet Sayal, Palo Alto, CA (US); Umeshwar Dayal, Palo Alto, CA (US); Ming-Chien Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 11/799,427

(22) Filed: Apr. 30, 2007

(51) Int. Cl.
*G06F 3/048* (2006.01)
*G06F 3/01* (2006.01)

(52) U.S. Cl. ......................................................... 715/769

(58) Field of Classification Search .................. 715/762, 715/763, 765, 766, 769, 779, 788
See application file for complete search history.

(56) References Cited

U.S. PATENT DOCUMENTS

| | | | |
|---|---|---|---|
| 7,371,811 B2 * | 5/2008 | Cohen et al. .................. | 530/300 |
| 7,490,295 B2 * | 2/2009 | Chaudhri et al. ............. | 715/764 |
| 7,503,010 B2 * | 3/2009 | Chaudhri et al. ............. | 715/764 |
| 7,530,026 B2 * | 5/2009 | Chaudhri et al. ............. | 715/764 |
| 2006/0005114 A1 * | 1/2006 | Williamson et al. .......... | 715/502 |
| 2006/0005207 A1 * | 1/2006 | Louch et al. .................. | 719/328 |
| 2006/0150118 A1 * | 7/2006 | Chaudhri et al. ............. | 715/800 |
| 2006/0156240 A1 * | 7/2006 | Lemay et al. .................. | 715/730 |
| 2006/0156248 A1 * | 7/2006 | Chaudhri et al. ............. | 715/779 |
| 2006/0156250 A1 * | 7/2006 | Chaudhri et al. ............. | 715/802 |
| 2006/0206835 A1 * | 9/2006 | Chaudhri et al. ............. | 715/781 |
| 2006/0274086 A1 * | 12/2006 | Forstall et al. ................ | 345/629 |
| 2006/0277460 A1 * | 12/2006 | Forstall et al. ................ | 715/513 |
| 2006/0277469 A1 * | 12/2006 | Chaudhri et al. ............. | 715/709 |
| 2006/0277481 A1 * | 12/2006 | Forstall et al. ................ | 715/764 |
| 2007/0101146 A1 * | 5/2007 | Louch et al. .................. | 713/176 |
| 2007/0101279 A1 * | 5/2007 | Chaudhri et al. ............. | 715/762 |
| 2007/0101288 A1 * | 5/2007 | Forstall et al. ................ | 715/781 |
| 2007/0101291 A1 * | 5/2007 | Forstall et al. ................ | 715/805 |
| 2007/0101297 A1 * | 5/2007 | Forstall et al. ................ | 715/841 |
| 2007/0101433 A1 * | 5/2007 | Louch et al. ................... | 726/25 |
| 2007/0106952 A1 * | 5/2007 | Matas et al. ................... | 715/764 |
| 2007/0118813 A1 * | 5/2007 | Forstall et al. ................ | 715/805 |
| 2007/0130541 A1 * | 6/2007 | Louch et al. .................. | 715/804 |
| 2007/0266093 A1 * | 11/2007 | Forstall et al. ................ | 709/204 |
| 2008/0034309 A1 * | 2/2008 | Louch et al. .................. | 715/766 |
| 2008/0034314 A1 * | 2/2008 | Louch et al. .................. | 715/778 |
| 2008/0163743 A1 * | 7/2008 | Freedman ........................ | 84/609 |
| 2008/0168292 A1 * | 7/2008 | Freedman ...................... | 713/375 |
| 2008/0168367 A1 * | 7/2008 | Chaudhri et al. ............. | 715/764 |

* cited by examiner

*Primary Examiner* — Nicholas Augustine

(57) ABSTRACT

Embodiments of the invention provide a method and an apparatus for creating a digital dashboard. One embodiment provides a dashboard palette in an application. In addition, at least one object is provided for the dashboard palette, wherein at least one property of the at least one object is linked to a data source. The at least one object is then coupled with the dashboard palette to form a dashboard description. The dashboard description is then exported to a dashboard creator and publisher, wherein the dashboard creator and publisher provide a functional dashboard based on the dashboard description.

16 Claims, 7 Drawing Sheets

METHOD AND APPARATUS FOR CREATING A DIGITAL DASHBOARD

TECHNICAL FIELD

The present invention generally relates to customized display content. More specifically to a method and apparatus for creating a digital dashboard.

BACKGROUND ART

Presently, digital dashboards are used to customize content by accessing information from a plurality of different sources and providing the content in a customizable format in a single location. For example, digital dashboards can include filtered email messages e.g., only the critical messages, a graph that gets its data from the stock price history of the company, a control panel to show the online status of the user's peers, a graph showing key revenue data pulled in real-time from the company's sales department, and the like.

In general, the digital dashboard gets its name from its appearance. That is, the digital dashboard is similar in function to a dashboard in a car or aircraft. For example, the gauges and indicators of the auto or aircraft dashboard are used to provide convenient and simplified decision making information that significantly increases the user's situational awareness. Similarly, the digital dashboard provides at-a-glance information such that presidents, vice presidents, managers, controllers, salespeople, customer service reps, and the like, will have greater situational awareness resulting in better, faster and more informed business decisions.

However, one problem with present digital dashboard design is the inherent customization thereof. That is, each digital dashboard is capable of performing different functions and providing different information based on a user's needs. Therefore, once a user decides what information is to be displayed on the digital dashboard and the format in which it is to be displayed, an experienced programmer is needed to generate the digital dashboard. That is, a programmer or technician is presently required to design the customized dashboard based on the user's requirements. In addition, the technician must also ensure that the dashboard correctly accesses the data and displays the information.

A second problem is that once the customized digital dashboard is operational, modifying the information provided by the dashboard requires the experienced programmer to rebuild the entire dashboard. For example, if the data being displayed is cost data for a week and the user decides the cost data should be displayed only for the day. Then, the programmer would need to reprogram the digital dashboard to display the newly desired data. During the reprogramming, the user assumes a plurality of penalties including digital dashboard downtime and the cost of modifying the dashboard. Therefore, in some cases, it may be necessary for a user to deal with a less than optimum digital dashboard instead of invoking the additional costs and time requirements necessary to modify the customized dashboard.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
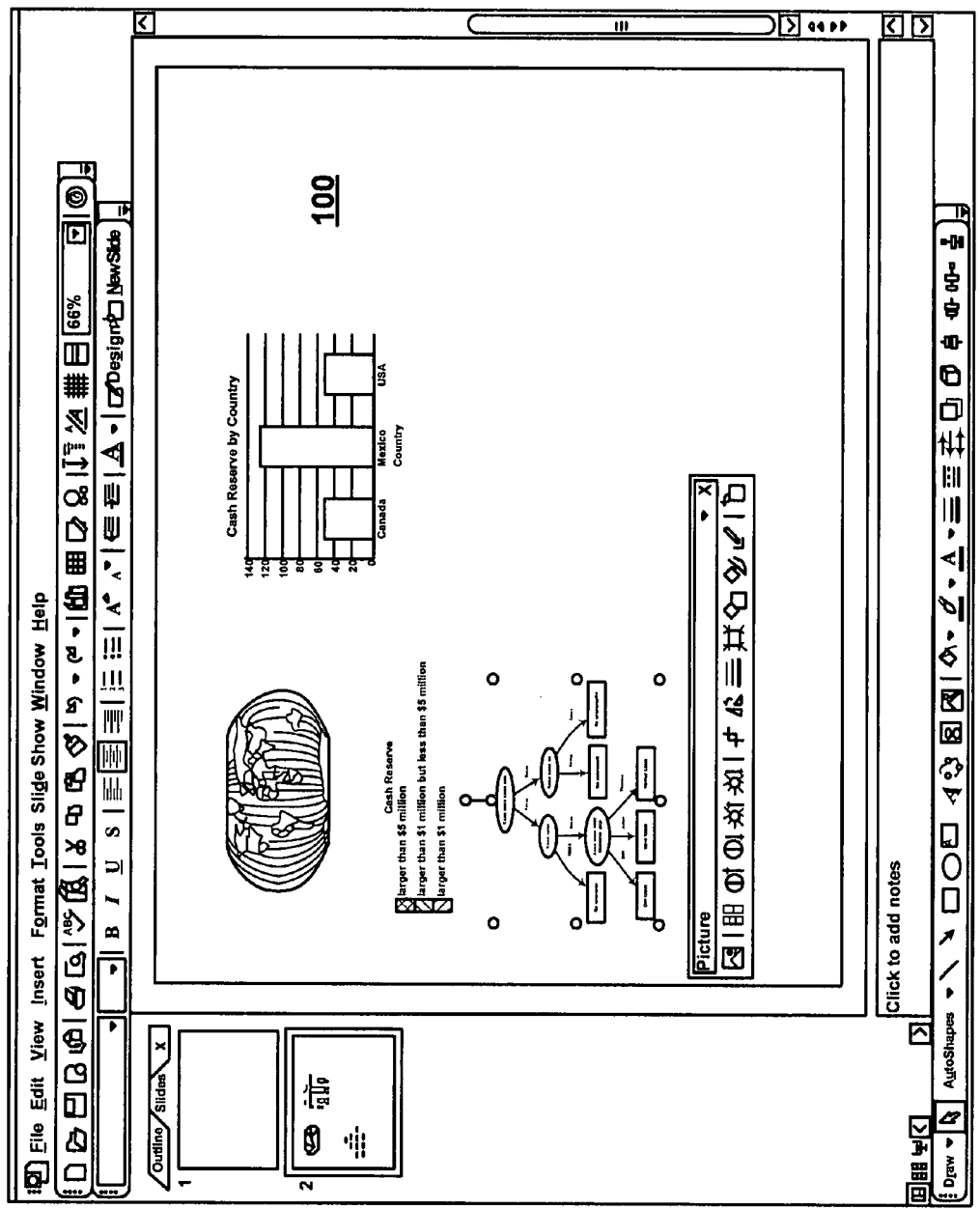
FIG. 1 is a diagram of an exemplary dashboard canvas in accordance with one embodiment of the present invention.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, objects, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments of the dashboard designer and generator described herein provide an automated method and apparatus for creating a digital dashboard. In general, embodiments described herein provide a method and apparatus for a user to define the content and layout of a customized digital dashboard by utilizing a familiar application such as a slideshow generator, a graphical program or the like.

Once the dashboard design is defined by the user, in the familiar application, the dashboard design is converted via a dashboard creator/publisher to an operational dashboard and is quickly and automatically made available to the user. Therefore, the user is able to utilize the methods and apparatus described herein to design and generate a customized digital dashboard while requiring little or no help from an experienced programmer or technician.

In one embodiment, the dashboard design also includes page layout properties such as letterhead, seals and the like. In addition, the dashboard design will include application properties such as financial application, supply chain application or the like. The dashboard design will also include icon properties such as metric data and metadata, e.g., duration, cost outcome or the like, presented visually, audibly or the like.

With reference now to FIG. 1, a diagram of an exemplary dashboard canvas 100 is shown in accordance with one embodiment of the present invention. In one embodiment, dashboard canvas 100 is a palette from a well-known graphics or visual program. For example, in FIG. 1, the dashboard canvas 100 is opened in a slideshow presentation application, a graphics application, a visual application, an audio application, or the like. Although the dashboard 100 is shown in a slideshow format, the dashboard 100 is capable of being generated in a plurality of application formats, such as those described herein (e.g. visual diagram presentation application and drawing presentation application). The use of a slideshow dashboard application is described herein merely for purposes of brevity and clarity.

Figure 2:
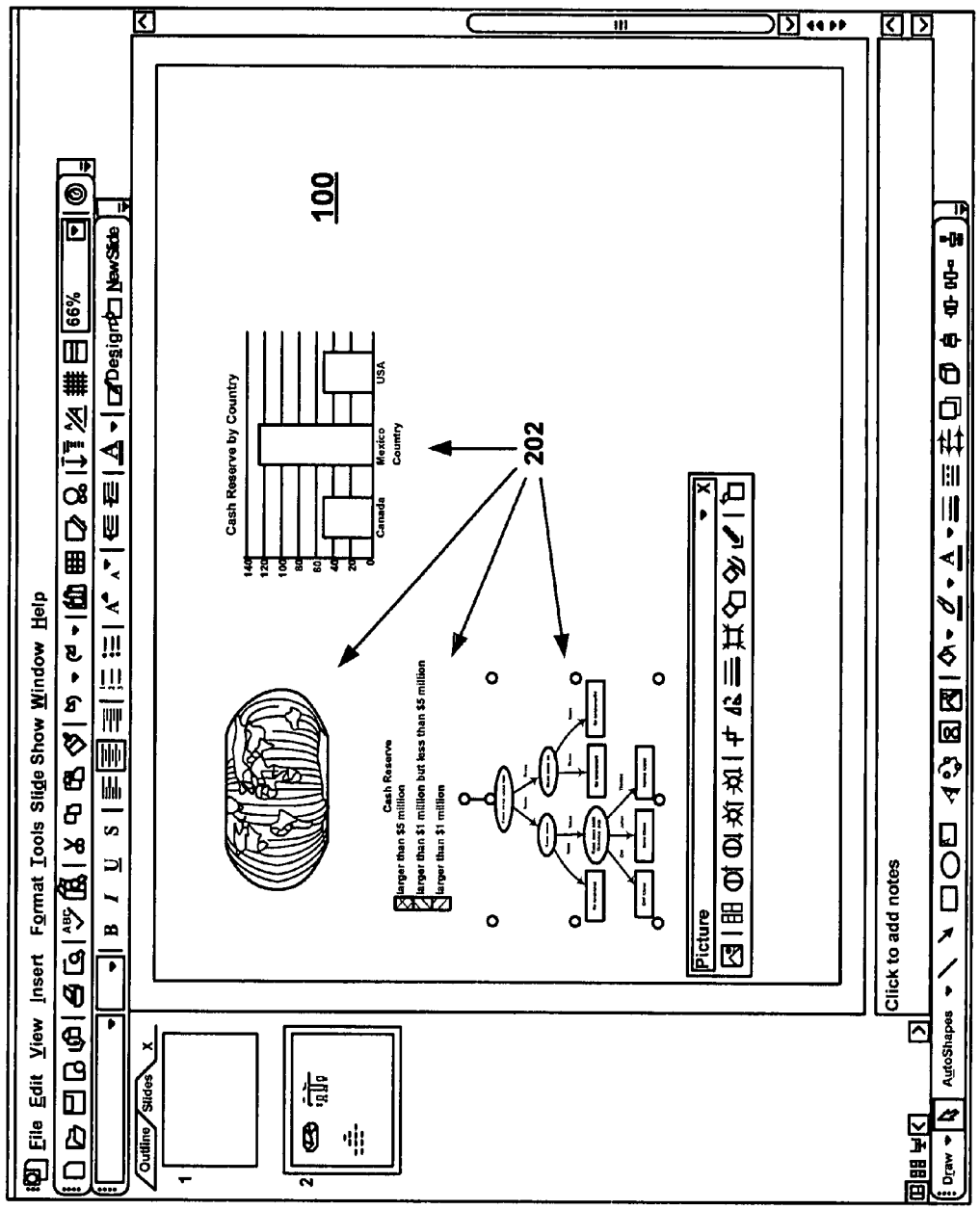
FIG. 2 is a diagram of an exemplary dashboard canvas including icons in accordance with one embodiment of the present invention.

Referring now to FIG. 2, a diagram of an exemplary dashboard canvas 100 including at least one object 202 is shown in accordance with one embodiment of the present invention. In one embodiment, the icon(s) 202 are native objects from the well-known application. In another embodiment, the icon(s) 202 are new objects created to extend the palette of the well-known application. In yet another embodiment, the icon(s) 202 are new objects created in a new palette for use with dashboard generation.

In one embodiment, the icon(s) 202 are objects that act appropriate to the functionalities for the infrastructure that monitors the data or generates the data to report on. In other words, the object 202 could include functionalities like mining, correlation, prediction and the like. For example, in the case of prediction, the object 202 could include a time slider object so that the end user could select the time for the prediction, and a dial chart object or a semaphore object to display the prediction. As stated herein, these icon(s) 202 would appear to the user as the native objects of the application.

Figure 3:
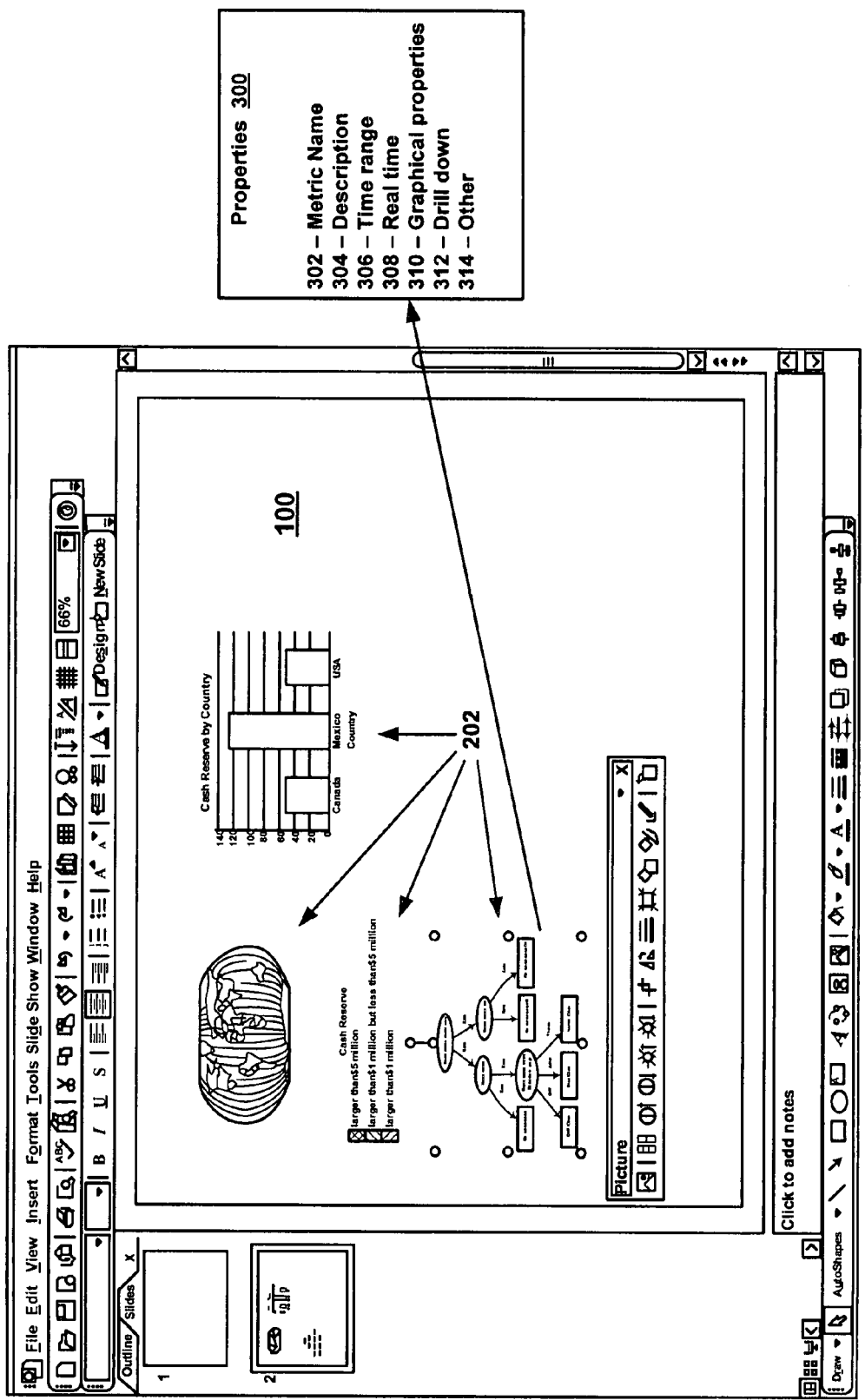
FIG. 3 is a diagram of an exemplary properties selection for an icon on a dashboard canvas in accordance with one embodiment of the present invention.

With reference now to FIG. 3, a diagram of exemplary properties 300 for an object 202 on a dashboard canvas 100 is shown in accordance with one embodiment of the present invention. In one embodiment, the properties 300 are the connection between the object 202 and the source of the information to be monitored such as the files or database where the information is stored. For example, once an object 202 is selected, the properties 300 will provide a user the capability for defining the object 202. That is, the object 202 will receive any or all of, a metric name 302, a description 304, a time range 306, real time 308, graphical properties 310, drill down capabilities 312 and other options 314.

In one embodiment, the metric name 302 reflects the metric being monitored by the object 202. For example, the metric name 302 could be cash reserve, duration, cost, outcome, or the like. The description 304 is a more descriptive title such as, for example, "cash reserve by country." The time range 306 allows a user to define the time frame that the metric is monitored. For example, the time range 306 could be an hour, a day, a week, a month, a year and the like. Real time 308 allows the metric to be defined as real time update, every minute update, when something changes update, when the metric moves into a predefined alert range, and the like.

Graphical properties 310 includes displayed properties such as a graph, a flowchart, a pie chart, a line chart, an audio alert, a visual signal or the like. Drill down 312 provides the option of a mouse click or other interaction with the icon to perform a drill-down to the next layer of data, e.g., view the underlying data or portions thereof. Other 314 provides the ability for the object 202 to be customized based on a specific need. For example, if the user is disabled and different presentation requirements are needed.

Figure 4:
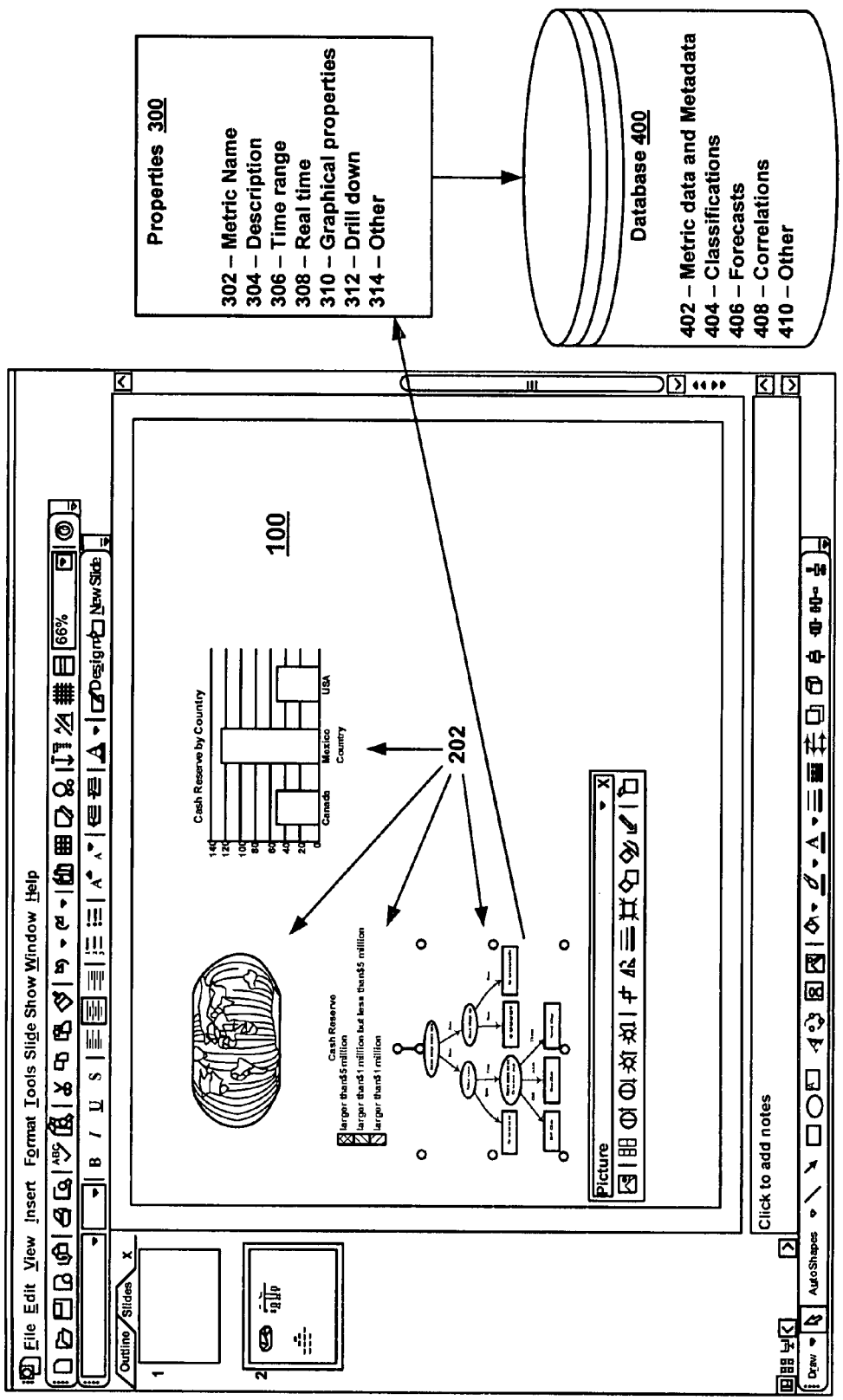
FIG. 4 is a diagram of an exemplary database referenced by an exemplary properties selection of an icon on a dashboard canvas in accordance with one embodiment of the present invention.

Referring now to FIG. 4, a diagram of an exemplary database 400 referenced by an exemplary properties 300 of an object 202 on a dashboard canvas 100 is shown in accordance with one embodiment of the present invention. In general, database 400 includes metric data and metadata 402 such as classification 404, forecasts 406, correlations 408 and other 410. Normally, the definition of the object 202 and its properties are defined in the metric data and metadata 402. For example, the object 202 on the dashboard 100 is connected to the database 400, so that when a new object (e.g., object 202) is needed and is linked to a certain metric (e.g., show me the service request volume forecast 406) the system can guide the user in the definition of what to display. For example, in one embodiment, each of the properties selections 300 is tied to the database as shown in FIG. 4. Therefore, if the metric in the database only holds data for the past week, then the time range 306 in the properties 300 will limit the selectable time range for that metric to a week or less.

Figure 5:
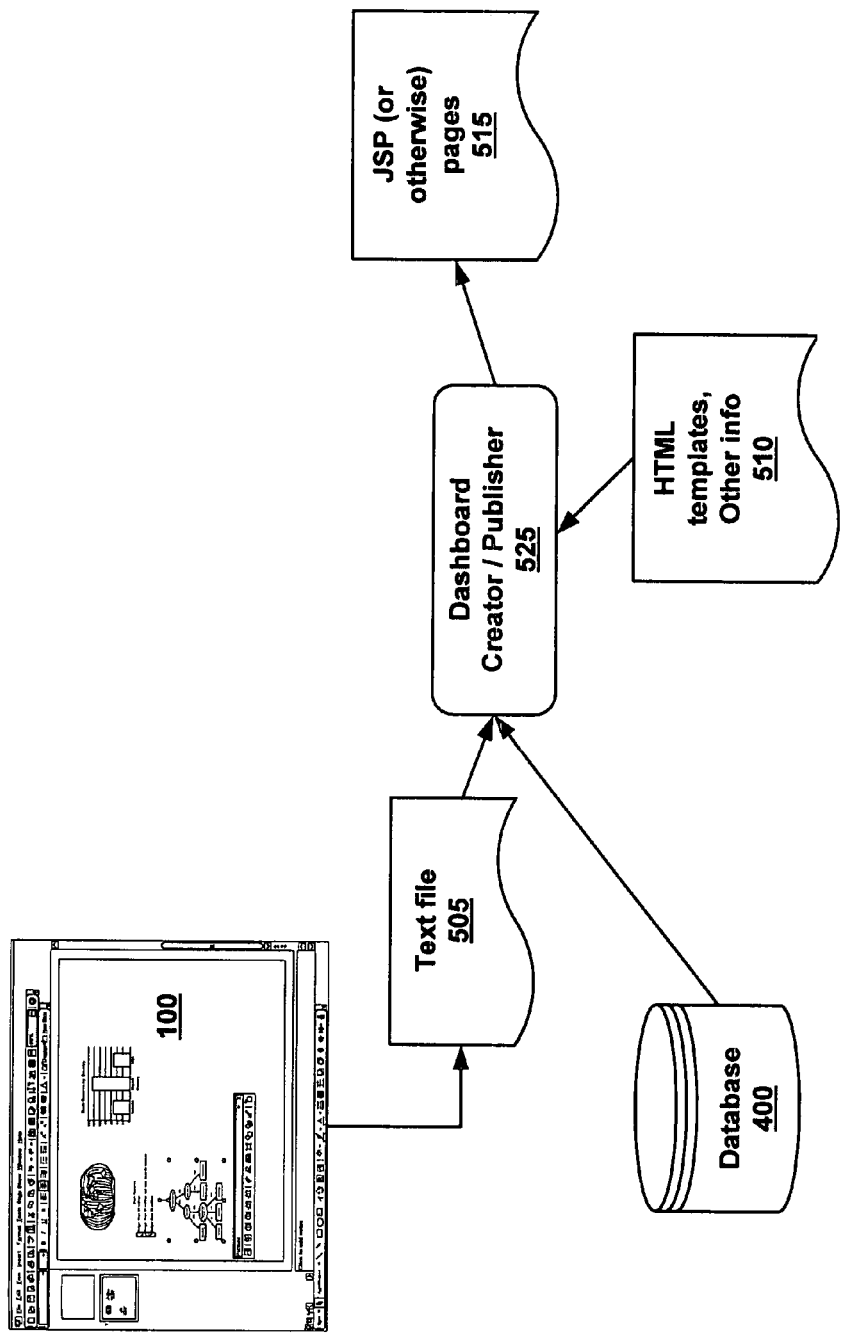
FIG. 5 is a block diagram of an exemplary creator/publisher of a dashboard canvas in accordance with one embodiment of the present invention.

With reference now to FIG. 5, a block diagram of an exemplary creator/publisher 525 of a dashboard canvas 100 is shown in accordance with one embodiment of the present invention. For example, in one embodiment, the dashboard design is performed in a slide show presentation format. The dashboard canvas 100 is then exported into a textual description e.g., in a text file 505. In one embodiment, the text file 505 is a dashboard description language. The text file 505 is then automatically received by the dashboard creator/publisher 525 and, based on hyper text markup language (HTML) templates 510 (e.g., forms, company logos, etc) the java server page (JSP) 515 is automatically created. In general, the JSP 515 is a dynamic graphical page. In another embodiment, manual intervention may be needed, in some cases, to refine the page design or correct errors associated with the initial text file 505 or previously laid out dashboard description.

Figure 6:
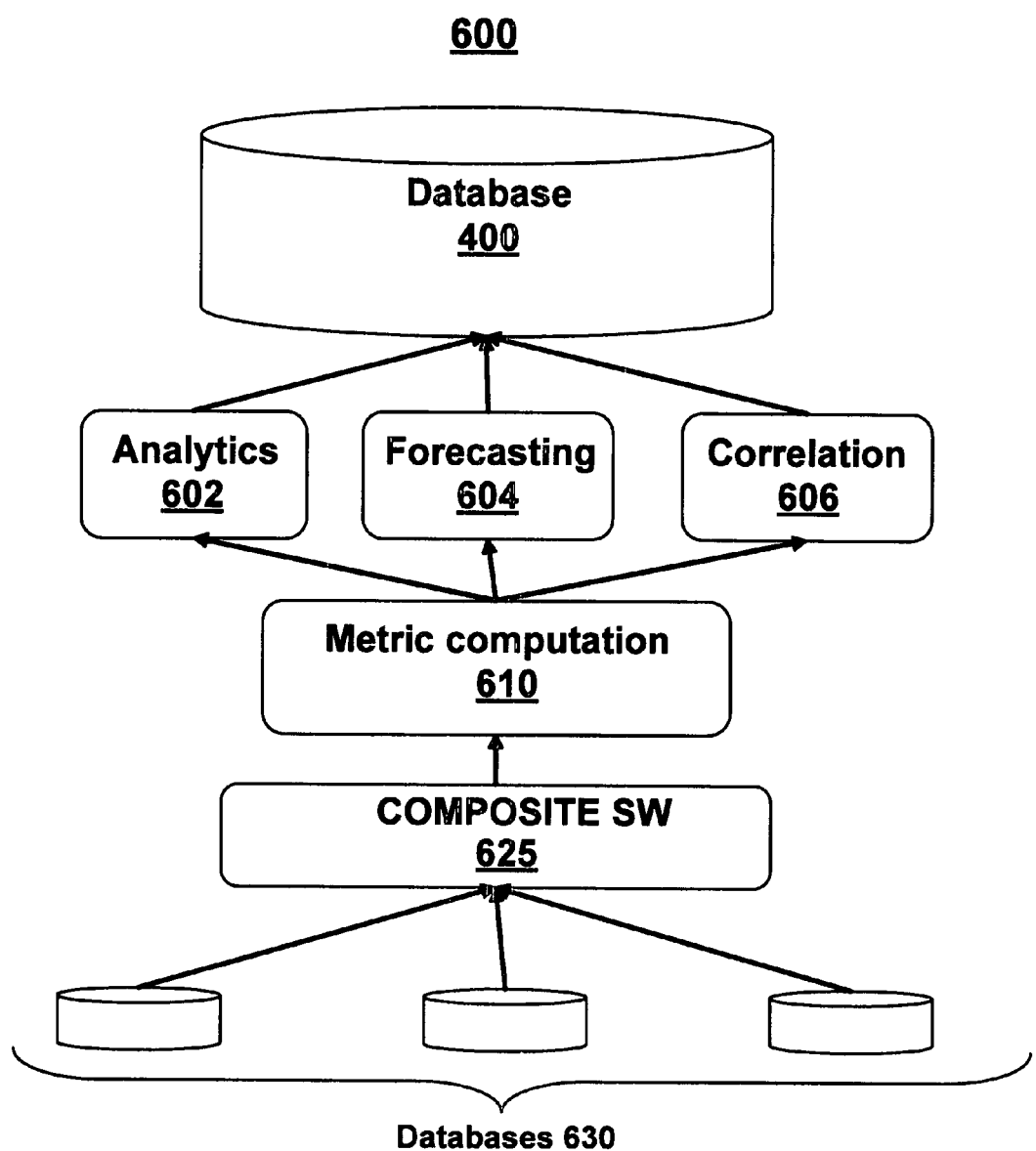
FIG. 6 is a block diagram of an exemplary metric data and metadata database in accordance with one embodiment of the present invention.

Referring now to FIG. 6, a block diagram of an exemplary metric data and metadata database 400 is shown in accordance with one embodiment of the present invention. In one embodiment, flowchart 600 includes the database 400 and the analytics 602, forecasting 604 and correlation 606 performed at lower levels. For example, the analytics 603, forecasting 604 and correlation 606 are performed by well-known metric computations 610 based on data received from a plurality of databases 630 and provided to a composite SW 625. The well-known metric calculations for performing analytics 602, forecasting 604 and correlation 606 are not described herein merely for purposes of brevity and clarity. Although analytics 602, forecasting 604 and correlation 606 are shown below database 400 at FIG. 6, any or all of analytics 602, forecasting 604 and correlation 606 may be above database 400. That is, in one embodiment, the data utilized by analytics 602, forecasting 604 or correlation 606 could be read directly from the sources (as data streams) instead of from the database 400.

Figure 7:
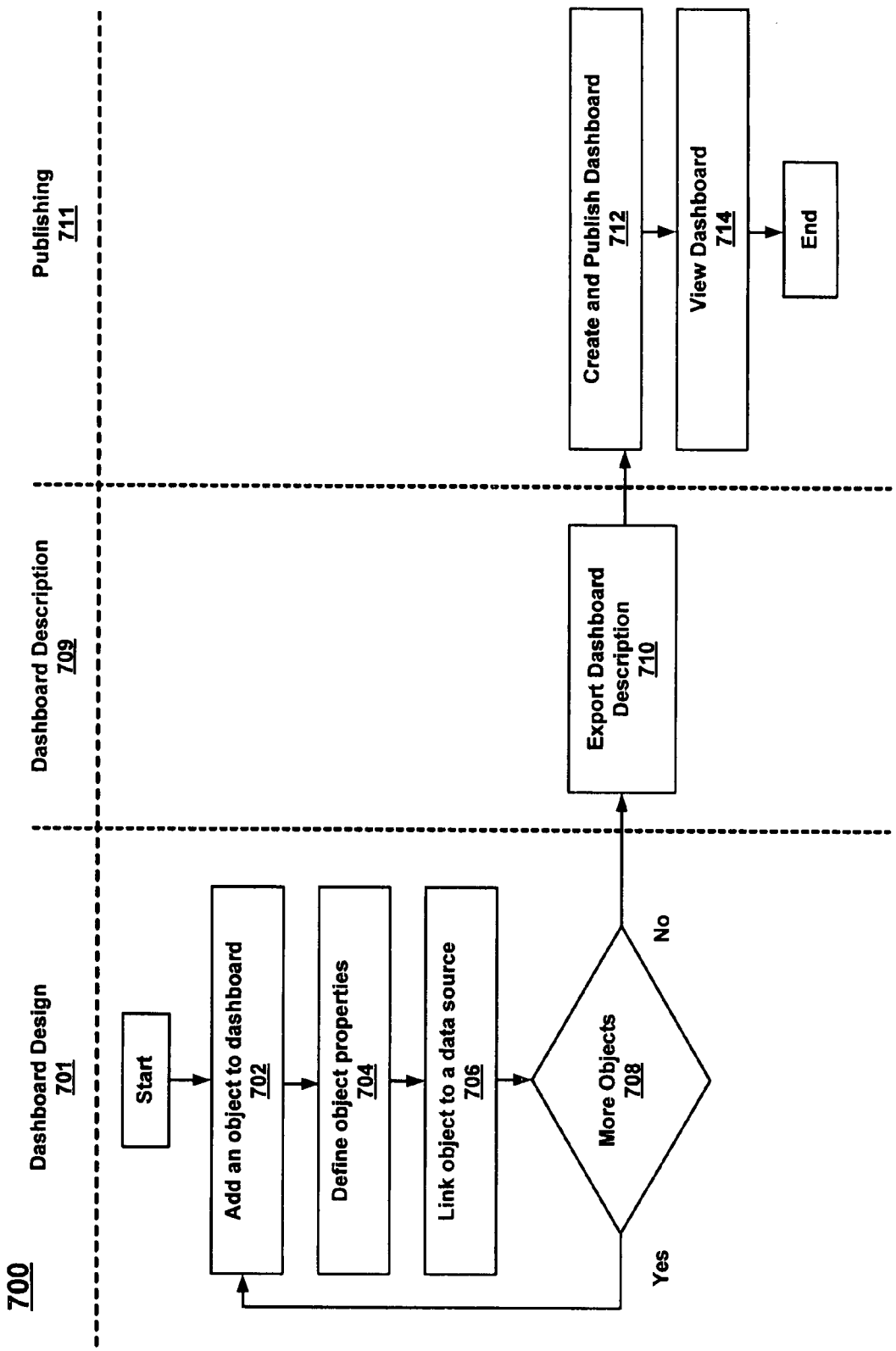
FIG. 7 is a flowchart of an exemplary method for creating a digital dashboard in accordance with one embodiment of the present invention.

With reference now to FIG. 7, a flowchart 700 of an exemplary method for creating a digital dashboard is shown in accordance with one embodiment of the present invention. In general, flowchart 700 provides the ability for a business user to customize the content and layout of a digital dashboard. For example, the user designs the customized dashboard interface using a familiar tool. Once the customized dashboard design is complete, the dashboard design is automatically provided to a dashboard creator/publisher application for automatic dashboard generation.

By using a familiar tool, the user can design a dashboard as easily as designing a slideshow presentation or visual diagram. In addition, the dashboard design is automatically converted into a skeleton web page application. For example as a JSP. Although one example provided herein describes the invention assuming the use of a slideshow application, the present invention is not limited to that application. That is, embodiments can be implemented across a broad range of other tools and applications. For purposes of clarity and brevity, Flowchart 700 is broken into three phases. A dashboard design phase 701, a dashboard description phase 709 and a publishing phase 711.

Referring now to 702 of FIG. 7 and to FIG. 2, an object 202 is added to a dashboard canvas 100. In general, the object 202 corresponds to a different reporting chart or object. For example, the object 202 may be a semaphore, a dial, a slider or the like. Each object 202 will have some object-specific properties, some default properties (characteristic of the environment), and will also retain all the graphical properties of the application being utilized.

In other words, the tool or application to which the dashboard canvas belongs (e.g., slideshow application or the like) is enriched with dashboard objects 202 appropriate to the functionalities of the infrastructure that monitors or generates the data to be reported. These objects 202 appear to the user exactly as the native objects of the tool. In one embodiment, this is achieved by extending the standard application palette of the application. In another embodiment, a new palette of objects 202 is created for the application. For example, in the case of prediction, object 202 will include a time slider object so that the end user can select the time for the prediction, and a dial chart object 202 or a semaphore object 202 to display the prediction.

With reference now to 704 of FIG. 7 and to FIG. 3, one embodiment defines the properties 300 of object 202. For example, on the dashboard canvas 100 a user drags and drops an object 202 having selectable and customizable properties. For example, the user can right click on the object 202 and the properties 300 options will appear. The user is then able to define the content, semantics and or properties of object 202. In one embodiment, the content, semantics and or properties include the metric name 302, the description 304, the time range 306 (e.g., show the sales for the last 6 months), how "real time" 308 the object should be, graphical properties 310, the drill down characteristics 312 and other user definable options 314.

Therefore, the objects 202 and their resulting customization properties 302-312 are made available to the user in a concise manner. While at the same time, a more sophisticated user is able to specify more advanced options by utilizing the other user definable options 314 capability. Although drag and drop is stated herein, a plurality of methods may be used for placing the object 202. The use of drag and drop (also referred to herein as a drag-drop environment) in the present example is merely for purposes of brevity and clarity.

Referring now to 706 of FIG. 7 and to FIG. 4, the object 202 is also linked to a database 400. In other words, the objects 202 on the dashboard canvas 100 will have connections to sources within database 400 from which metadata will be read. For example, the definition of the object 202 and its properties 300 are guided by metric data and metadata 402.

That is, the database canvas 100 and associated application are interconnected with the database 400. Therefore, when a new object 202 is linked to a certain metric (e.g., show me the service request volume forecast) the application can guide the user in the customizable options at the properties 300 level. For example, forecasts may be avail only for the next week so there would be not options at the properties 300 level to define forecasts 2 months ahead.

Thus, embodiments described herein not only allow the reporting of metrics data (actual, predicted, correlated, etc) on a digital dashboard but also support the user in defining the metrics themselves. For example, in one embodiment the user clicks on the object 202 and a properties 300 form appears. The user then fills in the properties 300 of the object 202 with specific values which are then utilized to select the appropriate data from the database 400. In one embodiment, there are different types of metrics dependent on the object 202 selected and for each one its implementation (e.g., how to compute the metrics) is done beforehand. Else, if the metric type is a new one, an IT person will have to specify its implementation and provide the necessary object 202 or features thereof.

Additionally, when reporting (vs. defining) a metric, the user adds a new dashboard object 202 on the canvas 100 and the tool connects to the database 400 and proposes a list of metrics from those that were created (and entered into the database 400) before. Then, when the user selects an object 202, a box with property 300 fields appears from which several of the fields are pre-populated automatically according to the type of the metric (and cannot be changed). Others are left to the user to define.

With reference now to 708 of FIG. 7 and to FIG. 4, once the object 202 is defined and linked to a database 400, the option is available to add another object 202 to the dashboard 708 or to export the completed dashboard description for creation. If another object 202 is to be added, then the process returns to 702 and the next object 202 to be added to the dashboard 100 is defined. However, if the customized dashboard is complete at 708 and no other objects 202 are to be added to the dashboard canvas 100, then the dashboard description is exported.

Referring now to 710 of FIG. 7 and to FIG. 5, one embodiment exports the dashboard description. For example, the dashboard canvas 100 design is exported in a textual description such as a dashboard description language (DDL). The DDL is automatically received by the dashboard creator/publisher 525 and, based on HTML templates 510 (e.g., forms, company logos, etc) the JSP page 515 is created. In other words, the specification of the dashboard canvas 100 is translated into an intermediate language that is used by a dashboard creator/publisher 525 to generate a JSP page 515. For example, the intermediate language is a "dashboard specification language", targeted at dashboards specified by high level users that can also report on "intelligent" items, such as correlation and forecasts. In another embodiment, manual intervention may be needed in some cases to refine the page design or correct errors. In one embodiment, the JSP page is a dynamic graphical page.

With reference now to 712 of FIG. 7 and to FIG. 5, the JSP page 515 is now an operational dashboard that is ready to be published. At 714, the operational dashboard is then published and the now functional dashboard is ready to be accessed. In one embodiment, the digital dashboard is accessed via a network or application server, e.g., web-based. At runtime, the generated JSP pages 515 will serve dynamic web content to the user, by retrieving customized metric/analytics/correlation data from the database 400 based on the objects 202 and there properties.

Additionally, due to the automated process for designing and publishing the dashboard, modifying the functional dashboard is also significantly simplified. For example, a user initially designed a customized dashboard that monitored the cash flow for the company on a weekly scale. However, after viewing the dashboard, the user realized that the cash flow for the company should be monitored on a smaller (or larger) scale. Then, instead of having to contact a technician and incurring technician costs and dashboard downtime while the dashboard is revamped, the user will simply access the saved dashboard file that was exported 710 to the dashboard creator/publisher 525 of FIG. 5. The user will then select the object 202 related to the cash flow monitor metric and adjust the time range 306 properties 300 to the newly desired range.

Once the object 202 properties 300 are redefined, the newly customized dashboard description is then provided to the dashboard creator/publisher 525. The dashboard creator/publisher 525 will then automatically create and publish the new dashboard with the now modified time frame metric. Therefore, the user will have significant customization capabilities to fine tune the initial (or follow on) user customized digital dashboard with little or no technical support costs.

Thus, embodiments of the present invention provide an automated method and apparatus for creating a digital dashboard. Embodiments further provide a method and apparatus for creating a customized digital dashboard that is designed and published with little or no technical support. In addition, embodiments provide a quick and simple method for adjusting, modifying, adding or deleting dashboard information.

Embodiments of the present invention are thus described. While the present invention has been described in particular embodiments, it should be appreciated that the present invention should not be construed as limited by such embodiments, but rather construed according to the following claims.

We claim:

1. A method for creating a digital dashboard, said method comprising:
   providing a dashboard palette, at a computer system, in a slide-show presentation application;
   providing at least one object for said dashboard palette, at said computer system, said at least one object appearing as a native object of said slide-show presentation, wherein at least one property of said at least one object is linked to a data source;
   coupling said at least one object with said dashboard palette, at said computer system, to form a dashboard description, wherein said dashboard description is a complete dashboard design; and
   exporting said dashboard description, at said computer system, in an intermediate text file format to a dashboard creator and publisher, wherein said dashboard creator and publisher provides a functional dynamic graphical dashboard in the form of a java server page based on said dashboard description.

2. The method of claim 1 further comprising:
   providing at least one page layout property for said dashboard palette.

3. The method of claim 1 further comprising:
   providing at least one application level property for said dashboard palette.

4. The method of claim 1 wherein said data source contains data selected from the group of data types including: metric data, metadata, classifications, forecasts, correlations, mining, and prediction.

5. The method of claim 4 wherein said data source is generated by a data source generation method comprising:
   collecting data from at least one database;
   computing at least one metric on said data; and
   computing at least one analytic on said at least one metric to generate said at least one property.

6. The method of claim 1 wherein said dashboard is a web-enabled dashboard generated by said dashboard creator and publisher in a dynamic graphical page format.

7. A web-enabled dashboard creator, coupled to a computer system, comprising:
   a dashboard palette, coupled to said computer system, in a drag-drop environment;
   at least one drag-drop object, coupled to said computer system, for said dashboard palette, said at least one object appearing as a native object of said drag-drop environment, wherein at least one property of said at least one drag-drop object is linked to a data source;
   a dashboard object coupler, coupled to said computer system, for coupling said at least one drag-drop object with said dashboard palette to form a dashboard description, wherein said dashboard description is a complete dashboard design; and
   a dashboard creator, coupled to said computer system, for receiving said dashboard description in an intermediate text file format and providing a functional web-enabled dynamic graphical dashboard in the form of a java server page based on a received dashboard description.

8. The web-enabled dashboard creator of claim 7 further comprising:
   at least one page layout property for said dashboard palette; and
   at least one application level property for said dashboard palette.

9. The web-enabled dashboard creator of claim 7 wherein said data source contains data selected from the group of data types including: metric data, metadata, classifications, forecasts, correlations, mining, and prediction.

10. The web-enabled dashboard creator of claim 9 wherein said data source is generated by a data source generator comprising:
    a collector for collecting data from at least one database;
    a metric generator for computing at least one metric on said data; and
    an analytic evaluator for computing at least one analytic on said at least one metric to provide at least one information item, wherein said collected data, said at least one metric on said data and said at least one analytic is available to link from said data source to said drag-drop object.

11. The web-enabled dashboard creator of claim 7 wherein said web enabled dashboard is generated by said dashboard creator in a dynamic graphical page format.

12. A computer-usable medium having computer-readable program code embodied therein for causing a method for creating a digital dashboard, said method comprising:
    providing a dashboard palette in an application;
    providing at least one object for said dashboard palette, said at least one object appearing as a native object of said application, wherein at least one property of said at least one object is linked to a data source;
    coupling said at least one object with said dashboard palette to form a dashboard description wherein said dashboard description is a complete dashboard design; and
    exporting said dashboard description in an intermediate text file format to a dashboard creator and publisher, wherein said dashboard creator and publisher provides a functional dynamic graphical dashboard in the form of a java server page based on said dashboard description.

13. The computer-usable medium of claim 12 further comprising:
   providing at least one page layout property for said dashboard palette; and
   providing at least one application level property for said dashboard palette.

14. The computer-usable medium of claim 12 wherein said data source contains data selected from the group of data types including: metric data, metadata, classifications, forecasts, correlations, mining, and prediction.

15. The computer-usable medium of claim 14 wherein said data source is generated by a data source generation method comprising:
   collecting data from at least one database;
   computing at least one metric on said data; and
   computing at least one analytic on said at least one metric to generate said at least one property.

16. The computer-usable medium of claim 12 wherein said dashboard description is exported to said dashboard creator at runtime to display content of said dashboard based on metrics selected from the group of metrics consisting of: a link with at least one html template, a source layout, and at least one portion of metric data associated with a graphical object.

* * * * *

UNITED STATES PATENT AND TRADEMARK OFFICE
CERTIFICATE OF CORRECTION

PATENT NO. : 8,291,334 B1
APPLICATION NO. : 11/799427
DATED : October 16, 2012
INVENTOR(S) : Maria G. Castellanos et al.

It is certified that error appears in the above-identified patent and that said Letters Patent is hereby corrected as shown below:

In column 8, line 25, in Claim 7, delete "lava" and insert -- java --, therefor.

In column 8, line 67, in Claim 12, delete "lava" and insert -- java --, therefor.

Signed and Sealed this
Fifth Day of February, 2013

Teresa Stanek Rea
*Acting Director of the United States Patent and Trademark Office*